INVENTORS
RAYMOND E. ZENNER
ROBERT M. BERGSLIEN
BY
Hudson, Boughton,
Williams, David & Hoffmann
ATTORNEYS March 10, 1959 R. E. ZENNER ET AL 2,877,404
GENERATOR CONTROL SYSTEM
Filed Dec. 8, 1955 3 Sheets-Sheet 2

INVENTORS
RAYMOND E. ZENNER
BY ROBERT M. BERGSLIEN
Hudson, Boughton,
Williams, David & Hoffman
ATTORNEYS

United States Patent Office 2,877,404
Patented Mar. 10, 1959

2,877,404

GENERATOR CONTROL SYSTEM

Raymond E. Zenner, Hollywood, and Robert M. Bergslien, Hazelcrest, Ill., assignors, by mesne assignments, to The Leece Neville Company, Cleveland, Ohio, a corporation of Ohio Application December 8, 1955, Serial No. 551,917

16 Claims. (Cl. 322—25)

This invention relates to control apparatus for electrical generating systems and more particularly to improved magnetic apparatus for controlling the field excitation of generating systems capable of operating at variable speeds and under variable load conditions.

The control of electrical generators operating under variable speed and variable load conditions involves the regulation of the excitation in response to a control signal representative of the load conditions. The control signal is usually compared with a reference which is adjusted to represent the desired load characteristics. If there is a differential between the control signal and the reference the resulting differential signal is used to change the excitation for returning the differential signal to zero.

In electromagnetic regulating systems, such as in vibratory or carbon pile regulators, a spring is used as the reference device. The control signal in those cases provides a mechanical output operating against the spring pressure, whereby the mechanical output is effective to vary the excitation in the correct direction. In completely electrical regulating systems an electrical quantity is generally used as a reference. This electrical quantity may take the form of a circuit providing a constant voltage output. The control signal is compared with this constant electrical voltage and any differential voltage obtained results in regulating the electrical load characteristics to return same to the preselected desired operating conditions. The latter type of regulating circuits also may involve the use of an amplifier when the regulating signal is of a small amplitude.

The selection of a regulating system in some instances is largely dependent on the reliability and life of the component parts of the system. The life of a system employing electromechanical devices or electronic devices is governed by the life of these devices. With the development of improved magnetic materials and rectifying devices, development has been directed towards the use of a completely static magnetic regulating system. The inherent long life of such a regulating system makes it particularly advantageous. Accordingly, it is desirable to provide a static magnetic regulating means for an electrical generating system which will have a long operating life, will be reliable and simple in construction and will be capable of maintaining the desired electrical load characteristics regardless of variations occurring in generator speeds and load conditions.

The present invention has as its principal object the provision of improved control apparatus for regulating the excitation of a dynamoelectric machine utilizing a simple variable impedance device therein without resorting to the use of mechanical or electromechanical devices in the control of the impedance device.

Another object of the present invention is to provide improved control apparatus for regulating the excitation of a dynamoelectric machine wherein the impedance device utilized in the apparatus is arranged to have an impedance characteristic of inverse relationship with respect to its input and output signals.

Still another object of the present invention is to provide an improved control apparatus of the aforementioned character wherein the input or control signal provided for the impedance device is a composite signal representative of the voltage and current characteristics of the load thereby obviating the need of separate circuits or devices for each electrical variable.

A further object of the present invention is to provide an improved magnetic control apparatus for regulating the excitation of a dynamoelectric machine wherein a magnetic amplifier is utilized as the impedance device and arranged to provide the excitation for the machine in an inverse relationship to a regulation signal provided therefor.

Yet another object of the present invention is to provide an improved magnetic control apparatus of the kind above referred to wherein the magnetic amplifier serves the function of a reference and comparison device as well as an amplifier.

Another object of the present invention is to provide an improved control apparatus for a dynomoelectric machine utilizing a magnetic amplifier as a variable impedance device wherein a point on the impedance or hysteresis characteristic of the amplifier is utilized as a reference point and the deviations of a control signal from the reference point are utilized to compare the deviation with a normal deviation therefrom to control the impedance of the magnetic amplifier.

Still another aim of the present invention is to provide an improved magnetic control apparatus for an electrical generating system wherein the electrical characteristics of the load connected to the system may be sensed to provide signals representative of the load characteristic and combined in a manner to provide a single, composite control signal for application to a magnetic amplifier exhibiting an inverse transfer relationship for controlling the excitation of the generating system to maintain the one or more output characteristics substantially constant.

A further aim of the present invention is to provide an improved control apparatus for a three-phase alternating current generator wherein the electrical signals representative of the load voltage and load current are combined in a differential relationship and the combination arranged in parallel with a load current limiting signal to provide a composite control signal representative of the electrical characteristics of the load for application to a single control device responsive to the composite control signal to vary the excitation of the field for the generator.

As an additional object this invention provides magnetic control apparatus for an alternating current machine wherein the control signal of the aforementioned character is utilized to alternately change the magnetic condition of a magnetic device and to alternately drive the magnetic device to saturation whereby the period of saturation determines the excitation for said machine.

The invention can be further briefly summarized as consisting in certain novel combinations and arrangements of parts hereinafter described in detail and particularly set out in the claims hereof.

In the accompanying sheets of drawings.

Figure 1:
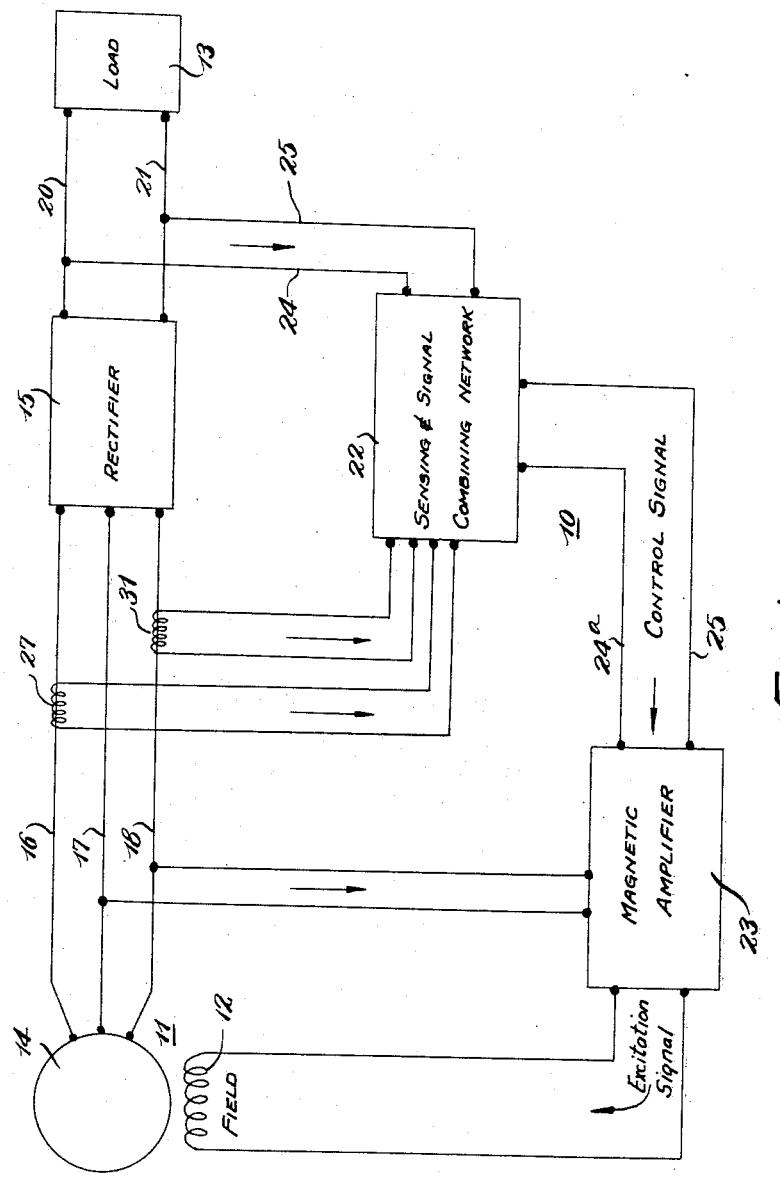
Fig. 1 is a block diagram showing a generator system control apparatus embodying the present invention and in which a magnetic amplifier is utilized in the control apparatus.

The control apparatus 10 of this invention is shown in the accompanying drawings as applied to a three-phase alternating current generator 11 having a self-excited shunt field winding 12, although the invention is also applicable to other dynamoelectric machines. The control apparatus 10 is arranged to maintain constant one or more output electrical characteristics of a direct current load or battery 13 through the provision of a regulating signal operative to control the excitation of the field winding 12.

The direct current load 13 is supplied by the armature 14 of the generator 11 through the medium of a main or power rectifier 15 connected between the armature and the load. The main rectifier 15 is a full wave three-phase rectifier which may be a bridge circuit arrangement of metallic disk rectifiers, having input terminals connected directly to the armature 14 through the three-phase lead wires 16, 17 and 18. The direct current output terminals for the main rectifier 15 are connected to the direct current load 13 through the load lead wires 20 and 21.

The control apparatus 10 comprises a sensing and signal combining network 22 and an impedance or switching device, in this instance in the form of a magnetic amplifier 23. The network 22 senses the electrical voltage and current characteristics of the load 13 and provides a control signal representative of the combined load characteristics to vary the magnetic condition or state of the magnetic amplifier 23 in accordance with the sensed signal characteristic. The magnetic amplifier 23 provides a regulating signal in response to the control signal for energizing the field winding 12 to maintain one or more of the characteristics of the load constant. The sensing portion of the network 22 is arranged to provide a load voltage signal, a load compensation signal and a limiting load current signal. When the load 13 is supplied by more than one generator, a load division signal may be provided for maintaining the division of the load between the generators substantially equal. The load division signal may be readily combined with the other signals to form a composite control signal, but for purposes of explaining the operation of the control apparatus 10, will at present be omitted and will be explained more fully hereinafter.

The load voltage signal is derived directly from the direct current or load side of the main rectifier 15. The load voltage signal is provided by connecting the control lead wires 24 and 25 to the positive load lead wire 20 and the negative load lead wire 21 respectively. A unilateral device or diode rectifier 26 is connected in series with the positive control lead wire 24 with its electrodes connected to allow the passage of positive potentials into the magnetic amplifier 23. The network 22 is arranged so that the normal control signal coupled to the magnetic amplifier 23 is this load voltage signal. This load voltage signal is presented to the magnetic amplifier 23 upon the assumption that the remaining signals are ineffective.

The remaining signals are derived from the alternating current side of the main rectifier 15 through the use of current transformers. The load compensation signal is derived by means of a current transformer 27 inductively coupled with one phase of the output of the armature 14, in this instance the lead wire 16. The current transformer 27 senses the alternating current delivered to the main rectifier 15 and any changes in the direct current supplied to the load 13 is reflected as a change in the alternating current and hence in the signal sensed by the transformer. The alternating current signal derived in this manner is applied to a full wave bridge rectifying circuit, generally identified by the reference character 28, to provide a direct current signal therefrom.

The direct current signal from the rectifier 28 is developed across a load compensation resistor 29. The load compensation resistor 29 is in turn connected in a series differential or bucking relationship with the load voltage signal provided by the control lead wires 24 and 25. Accordingly, it may be readily understood that in the presence of a load current the control signal delivered to the magnetic amplifier 23 will vary an amount proportional to the load current; for example, if the load current increases or decreases the load voltage signal will be decreased or increased an amount proportional to the load current. It has been found that this load compensation technique results in a more constant regulating characteristic.

The remaining signal, presently under consideration, is the load limiting current signal. The load limiting current signal is arranged so as to affect the composite control signal, comprising the load voltage signal and the load compensation signal, only when the load current exceeds a predetermined or threshold value. This load limiting current signal is derived by means of the current transformer 31 coupled in the lead wire 18. The output of the current transformer 31 is provided with a series resistance network connected in a parallel relationship with the transformer secondary and comprising a fixed resistor 32 and a variable resistor 33. A condenser 34 of a suitable capacitance value is also connected in parallel with the resistors 32 and 33. A full wave, bridge type rectifying unit 35 is also connected in a parallel relationship with the series combination of the resistors 32 and 33 to receive the voltage developed across the resistors. The voltage developed across the resistors 32 and 33 is adjusted by means of the latter resistor whereby the voltage received by the full wave rectifier 35 is equivalent to the sum of the load voltage signal and the load compensation signal when the generator 11 is operating to deliver its maximum allowable output current.

The direct current output of the rectifier 35 is connected in parallel relationship with the control lead wires 24a and 25a with the same polarities connected together. A capacitor 36 may be provided in a parallel relationship with the output of the rectifier 35 to act as a filter across the rectifier output. It should be noted that the control system 10 will operate with the omission of the capacitor 36. The capacitor 36 is connected in common with the cathode of the rectifier 26. The remaining terminal of the capacitor 36 is connected in common with the negative output lead wire 37 for the rectifier 35 and also in common with the positive terminal of the load compensation resistor 29.

The particular advantageous feature of the current limiting signal is that it is ineffective on the magnetic amplifier 23 since it is blocked by the combination of the load voltage and load compensation signals as long as the load current does not exceed the maximum desired value. However, as soon as the load current exceeds the predetermined or threshold value the current limiting signal takes over full control of the magnetic amplifier 23. It should be noted that this novel arrangement of signals provides an abrupt nonlinearity in the regulating characteristic of the control apparatus 10 at the point where the current limiter signal takes over full control of the magnetic amplifier 23.

The signal effectiveness derived from the current transformers 27 and 31 is dependent on the phase angle relationship between the line currents and the line voltage utilized to power the magnetic amplifier 23. The strength of these signals may be corrected through varying the load compensation resistor 29 and the variable load limiting resistor 33. The signal strength bears a direct relationship to the value of the resistors 29 and 33. The control signal delivered to the magnetic amplifier 23 may be further modified to compensate for variations of operating temperature and to adjust for desired load voltage range. The resistor 38 is provided in series with the negative lead wire 25a and is temperature responsive to adjust the control signal accordingly. The series combination of resistors 40, 41 and 42 are arranged in series with temperature compensation resistor 38 and the former resistors may be adjustable to provide the required voltage range from the control signal.

Figure 2:
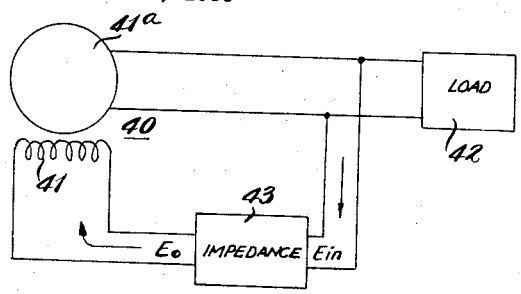
Fig. 2 is a simplified block diagram showing a generating system control apparatus embodying the present invention and in which a variable impedance device is utilized in the control apparatus.

Having provided a control signal representative of the combined load voltage and current characteristics it has been found that the signal must be applied to an impedance device exhibiting an inverse transfer relationship in response to the signal. Briefly considering Fig. 2, the desired characteristics for such an impedance device will be more readily apparent. A single prase alternating current generator 40 is shown having a self-excited shunt field winding 41. The field winding 41 is excited directly from the output of the armature 41a and is connected intermediate a load circuit 42 and an impedance device 43.

Overlooking the type of device 43 for the present, and merely considering the device as having the transfer characteristic of Fig. 3, the desired action to be derived therefrom will be made more evident. Further assume that the impedance device 43 is arranged to exhibit an impedance to a normal input control signal $E_c$, so as to provide a normal excitation for the field winding 41 corresponding to an output voltage $E'_c$, as may be seen in Fig. 3. Now if the load voltage increases to a point such as $E_B$ a corresponding increase in the input control signal to the impedance device 43 results, and in tracing this increase on the transfer characteristic it is seen that the excitation to the winding 41 decreases to a point $E'_B$. This decrease in excitation for the field winding 41 is effective to return the load voltage substantially to normal whereby the input control signal returns to the point $E_c$. Similarly, a decrease in load voltage to a point $E_A$ will result in an increase in the excitation to the winding 41 corresponding to a point $E'_A$.

Figure 3:
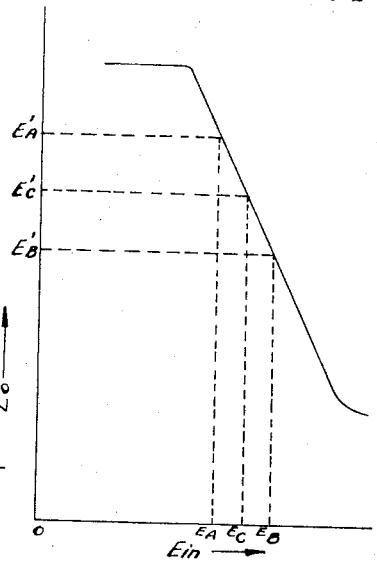
Fig. 3 is a graphical illustration of an ideal transfer characteristic for the impedance device shown in Fig. 2.
Figure 4:
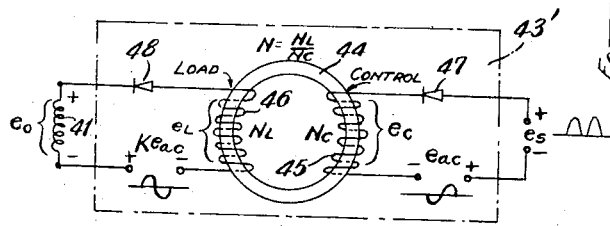
Fig. 4 is a schematic illustration of a magnetic amplifier circuit for the circuit shown in Fig. 2 and exhibiting a transfer characteristic similar to the one illustrated in Fig. 3.
Figure 5:
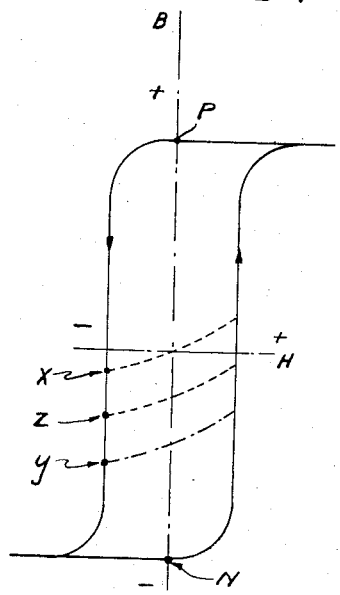
Fig. 5 is a graphical illustration of a typical hysteresis characteristic of the magnetic materials utilized in the present invention.
Figure 6:
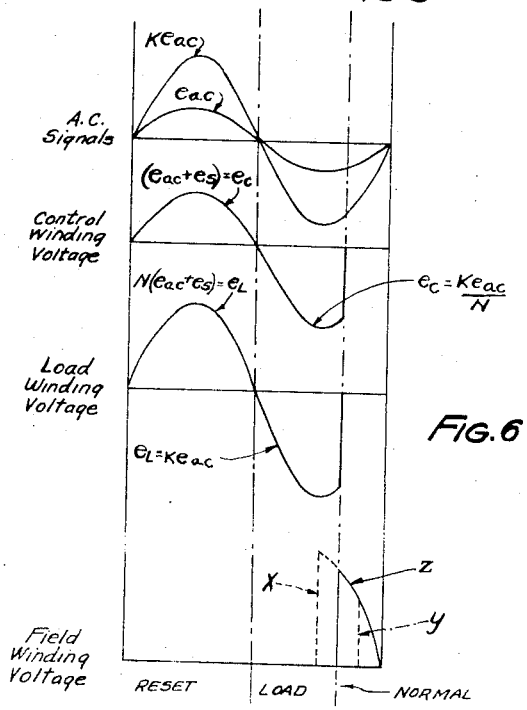
Fig. 6 is a graphical illustration of typical wave forms appearing in different portions of the magnetic amplifier circuit shown in Fig. 4.

An impedance device which has been found to exhibit the desirable transfer characteristic of Fig. 3 will now be considered with reference to Figs. 4 to 6. The impedance device 43 is assumed to be replaced by a half-wave magnetic amplifier circuit 43'. The magnetic core 44 for the amplifier 43' is provided with a control winding 45, and a load winding 46 wound thereon or coupled to the core. The input signal $E_c$, representative of the load characteristic is assumed to be a rectified, pulsating A. C. voltage and is additionally combined with an alternating current signal $e_{ac}$, of a greater amplitude and being substantially constant, coupled to the control winding 45. In series with the combined signals there is provided a unilateral device or rectifier 47. The rectifier 47 is connected with its anode in common with the positive lead of the input signal and its cathode connected to one terminal of the control winding 45. The A. C. voltage is coupled intermediate the remaining terminals of the winding 45 and the input signal. From this arrangement the method of energizing the control winding 45 will be evident.

The load winding 46 is similarly arranged on the magnetic core 44 with the interchanging of the input signal with a load circuit or the field winding 41. A rectifier 48 is connected with its anode to one terminal of the load winding 46 and its cathode to the field winding 41. An A. C. voltage is also provided for the load winding 46 and is connected intermediate the remaining terminals of the field winding 41 and the load winding 46. The A. C. voltage for the load winding 46 is assumed to be in phase with the A. C. voltage for the control winding 45. From the circuit arrangement of Fig. 4 and the pole relationship of the rectifiers 47 and 48, as just described, it will be recognized that the rectifiers permit the negative half-cycle current flow to pass through the windings 45 and 46 but block the positive half-cycle current flow from passing through these windings.

The magnetic core 44 is characterized by a square loop hysteresis characteristic; substantially as illustrated in Fig. 5, and is bi-stable, having two stable points of magnetic remanence P and N. The magnetic core 44 is assumed to be initially in a magnetic condition corresponding to the remanence point P. The operation of the magnetic amplifier 43' is best described by considering the effect of the A. C. signals on the core 44 during the different cycles of the A. C. signals, the positive half cycle being further identified as the reset and the negative half cycle as the load.

With these polarities of the A. C. signals applied to the windings for the core 44, it is seen that initially the load-winding 46 is deenergized since the rectifier 48 blocks the passage of the load signal. The control winding 45 is energized by the additive combination of the control A. C. signal $e_{ac}$, and the input signal $e_s$. If it be assumed that the control A. C. is signal acting alone is not sufficient to drive the magnetic core 44 to the remanence point N, but to some point above N and when combined with the input signal the resulting A. C. signal will allow a magnetizing current to flow in the winding 45, causing the core flux to traverse the hysteresis loop and assume a magnetic condition such as represented by the point Z.

During this reset half cycle, the voltage induced into the load winding 46 must be blocked by the load A. C. signal since the rectifier 48 will allow a current to flow in the load winding loop. Accordingly, the load signal must always have a greater amplitude than the induced voltage $N(e_{ac}+e_s)$ in the load winding 46, wherein N represents the turns ratio between the load and the control windings. The load A. C. signal will then be assumed to be $ke_{ac}$, where $k$ is a constant, to prevent current flow in the load circuit during reset.

During the load half cycle the polarities of the A. C. signals are reversed, and the control winding 45 will be substantially deenergized due to the blocking effect of the rectifier 47. However, with the change in polarities the load A. C. signal will energize the load winding 46. The load A. C. signal causes the load winding 46 to provide a magnetizing force in the magnetic core 44 sufficient to saturate the magnetic core. Upon saturation, the magnetic core 44 will assume a very low impedance value whereby a high current will flow through the field winding 41. The relative amount of time that the magnetic core 44 remains in a saturated condition relative to the complete load half cycle is dependent upon the point on the hysteresis curve that the previous control half cycle has positioned the core. The point Z corresponding to the point Ec in Fig. 3 is considered as the reference point and this saturation time represents the normal excitation for the field winding 41. On termination of the load half cycle the magnetic core 44 will slide back to the stable point P on the hysteresis loop.

Upon a change of load conditions effective to provide an input signal other than the normal input signal the magnetizing force produced by the control winding 45 will produce a change in the magnetic condition of the magnetic core 44, either above or below the point Z. Assuming an increase in input signal, the combination of the control A. C. signal and the increased input signal coupled to the control winding 45 will cause the magnetic core 44 to assume a magnetic condition similar to the point Y below the point Z. Accordingly, upon the energizing of the load winding 46, during the load half cycle the magnetic core 44 will be placed in a saturated condition later in the half cycle to thereby provide a smaller excitation current for the field winding 41, so as to return the load characteristics to its normal values. Similarly, upon a decrease in load voltage, the excitation for the control winding 45 will be decreased and the magnetic core 44 will assume a position on the hysteresis loop similar to the point X above point Z. On the load half cycle, the magnetic core will be saturated for a larger portion of the half cycle and the excitation current will be correspondingly increased. It may now be readily appreciated that the magnetic core 44 exhibits an inverse transfer characteristic similar to the one illustrated in Fig. 3.

A more complete analysis of this type of magnetic amplifier device may be had by reference to the publication of R. A. Ramey, in the Transactions of the A. I. E. E., vol. 70, part II, (1951) pp. 1215–1223 and entitled "On the Mechanics of Magnetic Amplifier Operation." It should be noted that the magnetic amplifier 43' as utilized in the present invention serves more than merely as an amplifying device but also provides a reference and a comparison circuit for the control apparatus, eliminating the requirement of separate circuits therefor.

Referring the regulation operation of the half-wave magnetic amplifier 43' to a full-wave circuit similar to the one illustrated in Fig. 7, the operation thereon of the foregoing composite control signal will now be described.

Figure 7:
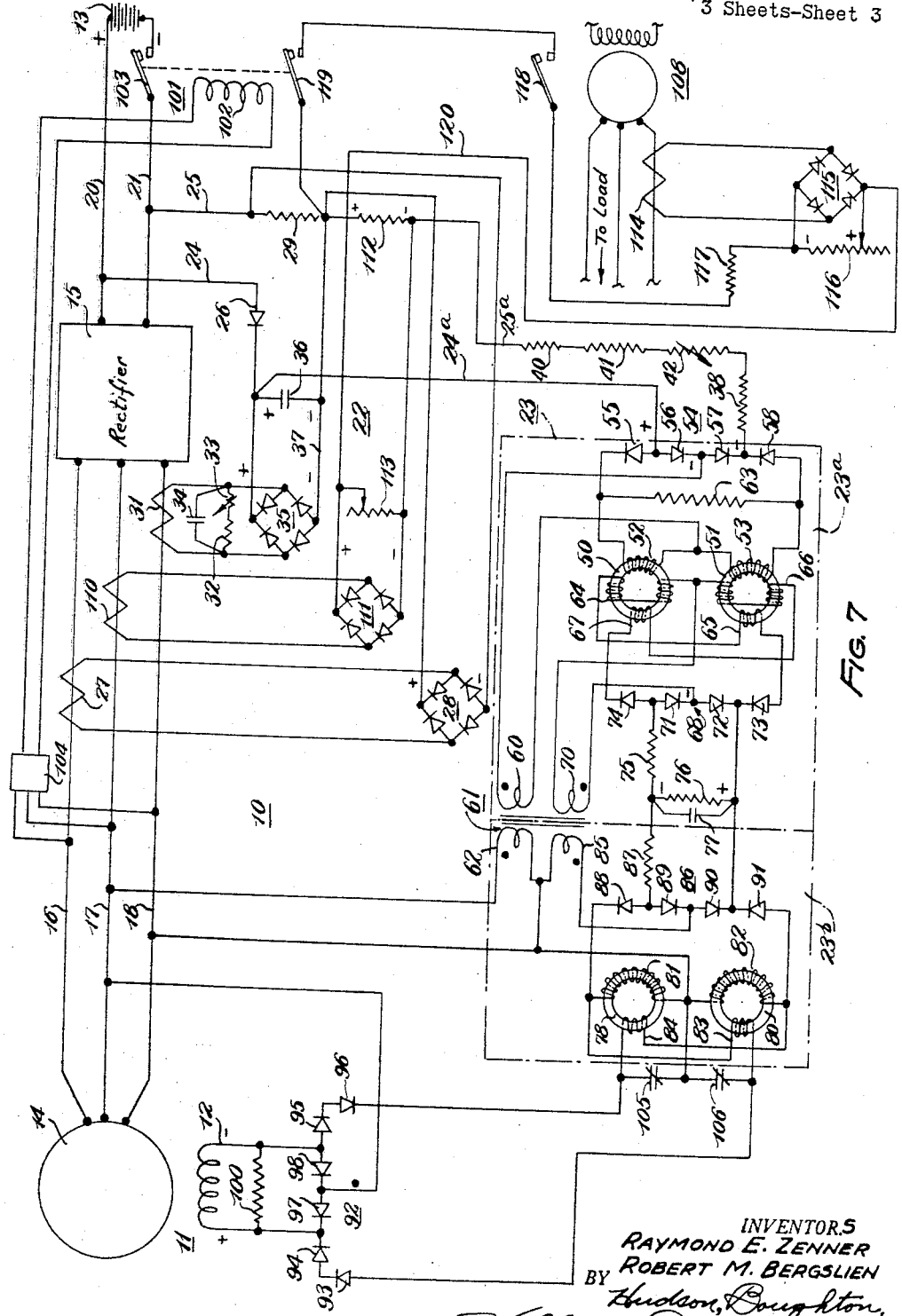
Fig. 7 is a schematic illustration showing a generating system control apparatus constructed in accordance with the block diagram of Fig. 1.

The magnetic amplifier 23 of Fig. 7 comprises a voltage amplifier 23a and a power amplifier 23b. Both the voltage amplifier 23a and the power amplifier 23b are full-wave parallel operated magnetic amplifiers. The voltage amplifier 23a is utilized to receive the signal from the network 22 and is characterized by having the desirable inverse transfer characteristic. The power amplifier 23b is arranged to receive the output signal from the voltage amplifier 23a and to amplify the same in a direct proportion for exciting the field winding 12.

The voltage amplifier 23a comprises a pair of matched magnetic cores 50 and 51, having the aforementioned square loop hysteresis characteristics. The magnetic core manufactured by the Arnold Engineering Co. of Marengo, Illinois, identified as Deltamax Cores have been successfully utilized in the present invention. The control winding 52 for the magnetic core 50 and the control winding 53 for the magnetic core 51 are each included in separate arms of a bridge rectifying circuit 54. The signal derived from the network 22 is applied across diagonally opposite terminals of the bridge circuit 54. The positive control lead wire 24a from the network 22 is connected in common with the anodes for the rectifiers 55 and 56 of the bridge circuit 54. The negative control lead 25a is connected in common with the cathodes for the rectifiers 57 and 58 of the bridge circuit 54.

A control A. C. signal of substantially constant amplitude is provided for the bridge circuit 54 and is derived from the secondary winding 60 of the power transformer 61. The primary winding 62 for the power transformer 61 is energized by the A. C. output of the generator 11 from the lead wires 17 and 18. The instantaneous positive terminal of the secondary winding 60 is indicated by a dot adjacent the terminal, as a convenient method of keeping the polarities in their correct relationship for purposes of analysis. Accordingly, the dot terminal for the secondary winding 60 is connected in common with the cathode for the rectifier 56 and the anode for the rectifier 57. The non-dot terminal for the winding 60 is connected to a point common to the control windings 52 and 53. The provision of a compensating resistor 63 connected in a parallel relationship between the uncommon terminals for the control windings 52 and 53 has been found to improve the regulating characteristic.

The magnetic core 50 is provided with a load winding 64 which is connected in a series relationship with a feedback winding 65 provided for the magnetic core 51. Similarly, a load winding 66 for the magnetic core 51 is connected in a series relationship with a feedback winding 67 provided for the magnetic core 50. The feedback windings 65 and 67 are each wound to couple to their respective magnetic cores a flux in opposition to the flux provided by the control windings 52 and 53. These series combinations of the load and feedback windings for each of the magnetic cores are arranged in the same arms of a bridge rectifying circuit 68 similar to the bridge circuit 54.

A load A. C. signal of substantially constant amplitude is connected between a diagonally opposite pair of terminals in the bridge circuit 68. The load A. C. signal is derived from a secondary winding 70 of the power transformer 61 and is arranged to be in phase with the control A. C. signal. The dot terminal of the secondary winding 70 indicates the instantaneous positive terminal, similar to the dot terminal for the secondary winding 60. The dot terminal for the secondary winding 70 is connected in common with the cathode for a rectifier 71 and the anode for a rectifier 72 arranged in separate arms of the bridge circuit 68. The non-dot terminal for the secondary winding 70 is connected to a point common to the load windings 64 and 66, that is the opposite terminals from the terminal connected to the corresponding feedback windings 65 and 67. The remaining terminal for the feedback winding 65 is connected to the anode of a rectifier 73, while the winding 67 is connected to the cathode of a rectifier 74.

The output signal derived from the load windings 64 and 66 is developed across the series resistors 75 and 76 connected across the remaining diagonally opposite terminals of the bridge circuit 68. The remaining terminal for the resistor 75 is connected in common with the anodes for the rectifiers 71 and 74, while the remaining terminal for the resistor 76 is connected in common with the cathodes for the rectifiers 72 and 73. The resistors 75 and 76 are arranged with the input circuit for the power amplifier 23b being connected in a parallel relationship with the resistor 76. The strength of the signal delivered to the power amplifier 23b may be controlled by controlling the relative values of the resistors 75 and 76. The resistor 76 may be further provided with a capacitor 77 connected across its terminals.

The power amplifier 23b is substantially similar in operation to the voltage amplifier 23a; however, as implied, it serves to provide a power signal rather than a voltage signal. Also, as hereinabove mentioned the power amplifier 23b is arranged to have a transfer characteristic so that its output signal is directly proportional to its input signal, and accordingly, the A. C. signal is arranged in a differential relationship with the signal provided by the voltage amplifier 23a.

The matched magnetic cores 78 and 80 of the power amplifier 23b are each arranged with single windings 81 and 82 respectively coupled thereto. The windings 81 and 82 are each arranged as autotransformer connections, in this instance with a 1:1 ratio, to alternatively function as a control and a load winding. The winding 81 for the magnetic core 78 is also connected in series relationship with a feedback winding 83 provided for the magnetic core 80. Similarly, the winding 82 is connected in series relationship with a feedback winding 84 provided for the magnetic core 78. A control A. C. signal provided for the power amplifier 23b is derived from across the primary winding 85 of the power transformer 61, while a load A. C. signal is derived across the lead wires 17 and 18. The dot terminals indicate similar polarities as previously mentioned. The dot terminal of the winding 85 is connected in common with the cathode for the rectifier 89 and the anode for the rectifier 90, while the remaining terminal is connected in common with the common terminals for the windings 81 and 82.

The input and output circuits for the magnetic cores 78 and 80 are each arranged in bridge rectifying circuits. The input signal developed across the resistor 76 is applied across a diagonally opposite pair of terminals in a bridge circuit 86. The negative terminal of the resistor 76, or a point common to the resistors 75 and 76, is connected to a series resistor 87 for delivering the signal into the bridge circuit 86. The opposite terminal of the resistor 87 is connected to a point common to the anodes of rectifiers 88 and 89. The positive terminal of the resistor 76 is connected directly to a point common to the cathodes of the rectifiers 90 and 91.

The output bridge rectifying circuit 92 also includes the windings 81 and 82 connected therein and in this instance have an additional rectifier connected in series with the windings, in the arm individual to same. The rectifier 93 is connected in series with the additional rectifier 94 provided for the winding 81, while the rectifier 95 in series with the additional rectifier 96 is provided for the winding 82. The field winding 12 is connected across the remaining diagonally opposite terminals of the bridge circuit 92 and receives the excitation signal provided by the magnetic amplifier 23b. The positive terminal of the field winding 12 is connected in common with the cathodes for the rectifier 94 and a rectifier 97, while the negative terminal is connected in common with the anodes for the rectifier 95 and a rectifier 98. In parallel relationship with the field winding 12 there is provided a compensation resistor 100 to prevent any tendency of the system to oscillate.

With the aforementioned structure in mind the operation of the control apparatus 10 will be more readily understood. The application of the load 13 across the output lead wires 20 and 21 for the main rectifier 15 and to the generator 11 is controlled by a load relay 101. The load relay 101 is utilized to connect the load 13 into and out of the system through its relay winding 102 and its associated relay contact 103 in a well known manner.

The relay winding 102 is energized from a control rectifier 104 in turn coupled to each of the lead wires 16, 17 and 18. The relay contact 103 is connected in series in the lead wire 21. The relay contacts 105 and 106 are also operated by the relay winding 102. The relay contacts 105 and 106 are connected in a parallel relationship with the output circuits of the magnetic cores 78 and 80 for the power amplifier 23b to thereby short out the control apparatus 10. The contacts 105 and 106 each have a terminal connected in common with the load A. C. signal input derived from the lead wire 18. The remaining terminal of the contact 105 is connected to the output terminal for the feedback winding 84, while the remaining terminal of the contact 106 is connected to the output of the feedback winding 83.

The generator 11 is arranged to build up due to its residual magnetism, upon the energization of the prime mover. The building up of the voltage is sensed and when it has reached a predetermined voltage the contacts 105 and 106 are opened and the control apparatus 10 is placed in the generator circuit.

The control signal delivered by the network 22 to the magnetic amplifier 23 is a composite voltage and current signal as hereinabove described. It should be noted that these signals have been arranged in a novel manner so that they may provide the composite signal without resorting to individual magnetic amplifier circuits or other switching devices for effecting a regulation in response to both types of signals.

The full wave magnetic amplifier 23a is arranged so that during the positive half cycles of the control and load A. C. signals derived from the secondary windings 60 and 70 respectively, the control winding 52, the load winding 66 and the feedback winding 67 are energized. During this positive half cycle the dot terminal is positive and the control A. C. signal passes through the diode 57, through the negative input lead wire 25a for the network 22 to the positive lead wire 24a to the diode 55 for the bridge circuit 54. The regulating signal resulting from the combination of the control A. C. and the control signal passes through the diode 55, through the control winding 52 for the magnetic core 50 and to the negative terminal of the secondary winding 60. The regulating signal passing through the control winding 52 generates a flux in the magnetic core 50 to reset it to a point on its hysteresis curve, in the neighborhood of point Z, depending on the strength of the control signal relative to the normal control signal. The polarity of the diode 58 in series with the control winding 53 for the magnetic core 51 prevents the energization of this winding during this positive half cycle and so its magnetic condition is unaffected by the control winding 53.

The load A. C. signal, being in phase with the control A. C. signal is arranged during the positive half cycle of the control A. C. signal to have its positive terminal or dot terminal connected intermediate the rectifiers 71 and 72. The load A. C. signal passes through the rectifier 72 to the positive terminal of the resistor 76, to resistor 75 and to the rectifier 74. The A. C. signal passing through the rectifier 74 energizes the feedback winding 67 and the load winding 66 in returning to the secondary winding 70. The rectifier 73 blocks the energization of the load winding 64. The energization of the feedback winding 67 during this half cycle sets up a flux which opposes the resetting flux in the magnetic core 50 and is arranged in this manner to compensate, in part, for the low back resistance of the rectifiers in the load circuits tending to limit the outputs. However, since it opposes the resetting action, the magnetic core 50 will be reset to a point of less remanence than when the resetting flux is acting alone. Therefore, during the subsequent load half cycle the magnetic core 50 will remain conducting for a proportionately longer time and a larger output will be provided in the load winding 64. It may be now readily appreciated that this feedback arrangement results in an increasing gain with a given input signal.

During the resetting of the magnetic core 50, the magnetic core 51 is going through a change of magnetic state due to the energization of the load winding 66. The flux generated by the energization of the load winding 66 is effective to saturate the magnetic core 51 for a period dependent on the resulting resetting action provided by the previous regulating signal applied to the control winding 53. The saturation of the magnetic core 51 causes the core to assume a relatively low value of impedance as a result of which a large voltage is developed across the output resistors 75 and 76 which is delivered to the input circuit for the magnetic amplifier 23b. Upon termination of the positive half cycle the magnetic core 51 slides back to its stable state such as to the point P.

During the negative half cycles of the A. C. signals the magnetic core 50 is being saturated while the magnetic core 51 is being reset. The dot terminal is now negative and so the control A. C. signal energizes the control winding 53 for the magnetic core 51 through the rectifier 58 the negative control signal lead wire 25a to the positive lead wire 24a and back through the rectifier 56. The control winding 52 is deenergized due to the blocking provided by the rectifier 55. The load A. C. signal during this interval has caused the energization of the load winding 64 and the feedback winding 65 through the rectifier 73 to the positive terminal of the resistor 76, resistor 75 and back through the rectifier 71. The rectifier 74 blocks the energization of the load winding 66. The flux generated by the feedback winding 67 opposes the resetting flux of the control winding 52 in the same manner as discussed. Similarly the period of saturation and the resulting output current resulting from the decreased impedance of the magnetic core 51 is dependent on the point on the hysteresis curve the core was previously reset to.

The voltages developed across the resistor 76 during the alternate saturations of the magnetic cores 50 and 51 are coupled into the bridge rectifier 86 and, through the action of this rectifier and of the amplifier 23b, control the excitation for the field winding 12. When the dot terminal becomes positive the control A. C. signal causes the combined winding 81 to act as the control winding for the magnetic core 78 while it is blocked from energizing the combined winding 82. The control A. C. signal passes through the rectifier 90 to the positive terminal of the resistor 76 through resistor 87 rectifier 88 and back to the negative A. C. terminal through the combined winding 81. The rectifier 91 blocks the energization of the combined winding 82. During this interval the load A. C. signal causes the combined winding 82 to act as a load winding. The load A. C. signal passes through the rectifier 97, to the parallel combination of the field winding 12 and the resistor 100 and then to the rectifier 95. The signal then passes through the rectifiers 95 and 96, then through the feedback winding 84 to the negative A. C. terminal by way of the combined winding 82. The saturation of the magnetic core 80 causes the excitation of the field winding 12 during this portion of the A. C. signal while the magnetic core 78 is being reset through the action of the differential ampere turns provided by the feedback winding 84 and the control winding 81.

As in the voltage amplifier 23a, on the negative half cycles, the magnetic cores 78 and 80 reverse in operation, that is, the magnetic core 78 is driven to saturation while the core 80 is being reset. The control A. C. signal energizes the winding 82 and passes through the rectifier 91 to the positive terminal of the resistor 76. From the resistor 76 the control A. C. signal returns to the positive terminal through the resistor 87 and the rectifier 89. The rectifier 88 prevents the energization of the combined winding 81 for the magnetic core 78 by the control A. C. signal. However, during this half cycle, the load A. C. signal has changed and the load winding 84 for the magnetic core 78 drives the core to saturation to excite the field winding 12. The load A. C. signal passes through the combined winding 81, the feedback winding 83 and to the field winding 12 through the rectifiers 93 and 94. From the field winding 12 the A. C. signal returns to its opposite terminal through the rectifier 98.

In the aforementioned circuit arrangement and operation of the magnetic amplifier 23, the arrangement of the amplifier to serve as a reference and a comparison device as well as an amplifier should be readily understood. By selecting a point on the impedance characteristic or hysteresis loop as a point of reference, the deviation of the control signal from that point acts to control the period of saturation for the amplifier. Having once arranged the magnetic amplifier 23 to provide an excitation current for the field winding 12, the excitation will be automatically controlled in response to the control signal variations through the control of the saturation period. This saturation period is arranged to be inversely proportional to the control signal provided for the voltage amplifier 23a and directly proportional to the signal for the power amplifier 23b by respectively combining them differentially and additively with an A. C. signal.

Referring now to the sensing and signal combining network 22, the operation of the control apparatus 10 to provide a load division signal effective to maintain a substantially equal division of the load between the generator 11 and another generator 108 will be described. A load division signal representative of the load provided by the generator 11 is sensed by a current transformer 110 coupled to the lead wire 17. The output of the current transformer 110 is provided with a full wave bridge rectifying circuit 111 associated with a load division resistor 112. Connected in a parallel arrangement with the output terminals of the rectifying circuit 111, there is provided a variable resistor 113. The load division resistor 112 is connected in a series relationship with the resistor 113 through circuit means extending to the output terminals of a bridge rectifying circuit 115. The load division resistor 112 is further connected into the lead wire 25 so that the voltage provided by the bridge circuit 111 develops a voltage across the resistor 112 in an additive relationship with the voltage signal.

Similarly, the generator 108 is provided with a current transformer 114 coupled into one of its output lead wires for providing a signal of the load delivered by the generator. The bridge rectifying circuit 115 is connected across the output of the current transformer 114. The output of the bridge circuit 115 is also provided with a series combination of a variable resistor 116 and load division resistor 117. The fixed terminal of the resistor 116 is connected to the negative output terminal of the bridge rectifier 115, while the positive terminal is connected to a variable arm. The load division resistor 117 has one terminal connected to the fixed negative terminal for the resistor 116 and to a terminal for the paralleling switch 118. The remaining terminal of switch 118 is connected to a terminal of a similar switch 119. The switch 119 has its opposite terminal connected to the positive terminal for the load division resistor 112. The positive terminals of the bridge rectifiers 111 and 115 are directly connected by a lead wire 120.

From the above mentioned circuit connections, it is seen that the load division signals are arranged in opposition and when the load is equally distributed between the generators 11 and 108, the voltages derived therefrom will be equal and opposite. The load division circuit may be adjusted by placing the load 13 across both the generators 11 and 108 and with the switches 118 and 119 open adjusting the voltages of the generators so that each is carrying one half of the load. Then upon closing the switches 118 and 119, the resistors 113 and 116 are adjusted so that the generators 11 and 108 again share the load equally, accordingly when this adjustment is made the voltages developed across the resistors 113 and 116 should be equal and opposite to leave the control signals for the generators unaffected.

If the load is changed and one of the generators assumes a larger proportion of the load, generator 108, for example, the voltage of resistor 116 will be larger than that of the resistor 113. Under these conditions current will flow through the resistors 112 and 117 in the direction of the voltage developed across the resistor 116. The current flow will develop a voltage across the resistor 112 which will subtract from the control signal applied to the magnetic amplifier 23. This decrease in control signal causes an increase in excitation to the field winding 12, effective to increase the output of the generator 11 for returning the system to balance once again. The voltage developed across the resistor 117 will be in an additive relationship to the control signal provided from its sensing and signal combining network for its magnetic amplifier (both not shown) to decrease the excitation and in turn to reduce the output voltage.

From the accompanying drawings and the foregoing detailed description it will now be readily understood that this invention provides a control apparatus for regulating the excitation of a variable speed, variable load generator by the use of a magnetic amplifier device. The electrical characteristics of the load are sensed and combined in a single novel network to provide a composite signal of the voltage and current characteristic of the load, including a limiting load current signal. These signals are combined without resorting to separate circuits or mechanical switching devices. The composite control signal derived in this manner is directly applied to control the periods of saturation of a magnetic amplifier to thereby control the excitation for the generator. The control signal is combined in an additive relationship with an A. C. signal to cause the magnetic amplifier to exhibit a transfer characteristic of inverse relationship in response to the combined or regulating signal. The magnetic amplifier is arranged and used in a novel manner to eliminate the need for separate circuits to serve as a reference and for comparing the regulating signal to a reference. This combination of functions results from the use of a stable point on the hysteresis characteristic as a reference and causing the magnetic condition to vary about that point. The variations of the magnetic condition are effective to change the subsequent saturation periods of the magnetic core whereby the excitation is controlled proportionately.

Although the generating system control apparatus of this invention has been illustrated and described herein to a somewhat detailed extent, it will be understood, of course, that the invention is not to be regarded as being limited correspondingly in scope but includes all changes and modifications coming within the terms of the claims hereof.

Having thus described our invention, we claim:

1. In a regulating system for a dynamoelectric machine having an excitation winding, a load connected to said machine, sensing means for supplying a control signal representative of the machine loading, a magnetic core having a control winding and a load winding coupled thereto, said magnetic core having at least a single stable state and being in said state, means for supplying an electrical signal of substantially constant amplitude and for combining said electrical signal with said control signal in an additive relationship, means for applying said thus combined signals to said control winding, the combined signals being effective to change said stable state, means for supplying a further electrical signal of substantially constant amplitude and for momentarily applying said latter electrical signal to said load winding alternately with respect to the signal applied to said control winding whereby said latter signal is effective to return the magnetic core to said stable state and to cause a substantial change in the impedance of said magnetic core, and means for connecting said excitation winding to said load winding to receive the current flowing through said load winding only upon said change of impedance, said duration of change in impedance being inversely proportional to the combined signal applied to said control winding.

2. In an electrical generating system, an alternator, a field winding for said alternator, a load circuit connected to said alternator, sensing means for deriving a control signal representative of the electrical characteristic of said load circuit, a magnetic core having a control winding and a load winding coupled thereto, said magnetic core being in a stable magnetic state, means for coupling said control signal to said control winding, means for deriving an alternating current signal from said alternator and for coupling same to said control winding in a series relationship with said coupling means and control signal, a unilateral device connected in a series relationship with said control winding to pass a signal through said winding when the polarity of said alternating current signal and said control signal are in an additive relationship to thereby provide a regulating signal for said control winding, said regulating signal being proportioned to change the magnetic condition of said core away from said stable magnetic state, means for deriving a further alternating current signal from said alternator and for coupling said latter mentioned signal to said load winding, said field winding being connected in a series relationship with said load winding and to said load winding alternating current signal, and a unilateral device connected in a series relationship with said load winding and said load winding alternating current signal to alternately pass currents through said load winding with respect to said regulating signal passing through said control winding, said load winding alternating current signal being proportioned to saturate said magnetic core, said magnetic core returning to said stable state upon the termination of said load winding alternating current signal, whereby the saturation period of said magnetic core is inversely proportional to said regulating signal and the currents resulting therefrom being effective to maintain at least one of the electrical characteristics of said load circuit substantially constant.

3. In an electrical generating system, an alternator, a field winding for said alternator, a load circuit connected to said alternator, sensing means for deriving signals representative of the voltage and current characteristics of said load circuit, circuit means for receiving and combining said signals and to derive therefrom a composite control signal, a magnetic core having a control winding and a load winding coupled thereto, said core being in a predetermined magnetic condition, means for coupling said control signal to said control winding, means for supplying an alternating current signal and for coupling same in combination with said control winding, a unilateral device connected in a series relationship intermediate said control winding and said circuit means and combination of signals and poled to pass a signal through said control winding only when said signals combine in an additive relationship, said control signal and said alternating current signal being proportioned to change the predetermined magnetic condition of said core, means for supplying a further alternating current signal and for coupling same to said load winding, said field winding being connected in a series relationship with said load winding and to said load winding alternating current signal, and a unilateral device connected in a series relationship with said load winding to pass said load winding signal current through said load winding to alternately change the magnetic condition of said core in an opposite direction with respect to said control winding signal and to thereby effect a transfer change, said magnetic core exhibiting an impedance characteristic of inverse relationship in response to said control winding signal.

4. In an electrical generating system, an alternator, a field winding for said alternator, a load circuit connected to said alternator, circuit means connected in a parallel relationship with said load circuit for providing a signal representative of said load voltage, sensing means coupled to said alternator for providing a load limiting current signal, means for connecting said load limiting current signal in a parallel relationship with said voltage signal with the polarities connected the same as said voltage signal and proportioned to provide a signal of substantially the same voltage magnitude to correspond to a predetermined load limiting current whereby said signals provide a control signal, a magnetic core having a control winding and a load winding coupled thereto, said core being in a stable magnetic state, means for coupling said control signal to said control winding, means for supplying an alternating current signal and for coupling same to said control winding in a series relationship with said control signal, a unilateral device connected in a series relationship with said control winding to pass a signal through said winding when the polarity of said alternating current signal and said control signal are in an additive relationship to thereby provide a regulating signal for said control winding, said control signal and said alternating current signal being proportioned to change the magnetic condition of said core from said stable magnetic state, means for supplying a further alternating current signal and for coupling same to said load winding, said field winding being connected in a series relationship with said load winding and said load winding alternating current signal, and a unilateral device connected between said load winding and said field winding to alternately pass currents through said load winding with respect to said regulating signal passing through said control winding, said load winding alternating current signal being proportioned to saturate the magnetic core and to return said core to said stable state upon termination of said load winding signal whereby the saturation period of said magnetic core is inversely proportional to said regulating signal and effective to maintain at least one of the electrical characteristics of said load circuit substantially constant.

5. In an electrical generating system, a polyphase alternator, a field winding for said alternator, a load circuit connected to said alternator, circuit means connected in a parallel relationship with said load circuit for providing a signal representative of said load voltage, sensing means coupled to one of the phases of said alternator to derive a signal representative of the current for said load circuit, means for connecting said current signal in series opposition with said voltage signal, further sensing means coupled to another phase of said alternator for providing a load limiting current signal, means for connecting said load limiting current signal in a parallel relationship with the series combination of said voltage and current signals, said load limiting current signal being connected with the polarities connected the same as said voltage signal and proportioned to provide a signal of substantially the same voltage magnitude as said series combination of signals corresponding to a predetermined load limiting current whereby the arrangement of signals provide a composite control signal, a magnetic core having a control winding and a load winding coupled thereto, said core being in a stable magnetic state, means for coupling said control signal to said control windings, means for supplying an alternating current signal and for coupling same to said control winding in a series relationship with said control signal, a unilateral device connected in a series relationship with said control winding to pass a signal through said winding when the polarity of said alternating current signal and said control signal are in an additive relationship to thereby provide a regulating signal for said control winding, said control signal and said alternating current signal being proportioned to change the magnetic condition of said core from said stable magnetic state, means for supplying a further alternating current signal and for coupling same to said load winding, said field winding being connected in a series relationship with said load winding and said load winding alternating current signal, and a unilateral device connected between said load winding and said field winding and being arranged to alternately pass the load winding alternating current signal through said load winding with respect to said regulating signal passing through said control winding, said load winding alternating current signal being proportioned to saturate the magnetic core and to return said core to said stable state upon termination of said load winding signal whereby the saturation period of said magnetic core is inversely proportional to said regulating signal and effective to maintain at least one of the electrical characteristics of said load circuit substantially constant.

6. In a regulating system for an alternating current machine having an excitation winding, a direct current load circuit, a main rectifier connected intermediate said load circuit and said machine, means for supplying an electrical signal representative of said load voltage, means for supplying an electrical signal representative of said load current, means for combining said signals to provide a composite electrical signal, a magnetic core having a control winding and a load winding coupled thereto, said magnetic core being in a predetermined magnetic condition, means coupling said composite electrical signal to said control winding, means for supplying an alternating current signal and for coupling same to said control winding in combination with said composite electrical signal, a unilateral device connected intermediate said control winding and the means for providing the combination of signals to pass only a portion of said combined signal to excite said control winding, said electrical signal and said alternating current signal being proportioned to effect a change of said predetermined magnetic condition of said core, means for supplying a further alternating current signal and for coupling same to said load winding, said excitation winding being connected to said load winding and to said alternating current signal, and a unilateral device connected intermediate said control winding and said excitation winding to pass said load winding alternating current signal through said load winding alternately with respect to the excitation for said control winding, said load winding signal being proportioned to cause the magnetic core to saturate whereby the saturation period is inversely proportional to said signal applied to said control winding.

7. In a regulating system for an alternating current machine having an excitation winding, a direct current load circuit, a main rectifier connected intermediate said load circuit and coupled to said machine for supplying an electrical signal representative of said load voltage, further means coupled to said machine for supplying an electrical signal representative of the said load current, means for combining said signals in a differential relationship to provide a composite electrical signal, a magnetic core having a control winding and a load winding coupled thereto, said magnetic core being in a predetermined magnetic condition, means coupling said composite electrical signal to said control winding, means for deriving an alternating current signal from said machine and for coupling same to said control winding in combination with said composite electrical signal, a unilateral device connected intermediate said control winding and the means for providing said differentially related signals and the means for deriving said alternating current signal to pass said signals only when they combine in an additive relationship to excite said control winding, said electrical signal and said alternating current signal being proportioned to effect a change of said predetermined magnetic condition of said core, means for deriving a further alternating current signal from said machine and for coupling same to said load winding, said excitation winding being connected to said load winding and to said latter mentioned alternating current signal means, and a unilateral device connected intermediate said load winding and said excitation winding to pass said latter alternating current signal through said load winding alternately with respect to the excitation for said control winding, said load winding alternating current signal being proportioned to cause the magnetic core to saturate whereby the saturation period is inversely proportional to the combined signals for said control winding.

8. In an electrical generating system, a polyphase alternator, a field winding for said alternator, a load circuit connected to said alternator, circuit means connected in a parallel relationship with said load circuit for providing a direct current voltage signal representative of said load voltage, sensing means coupled to one of the phases of said alternator to derive a direct current voltage signal representative of the current supplied to said load circuit, means for connecting said current signal in series with said voltage signal in an additive relationship, further sensing means coupled to another phase of said alternator for providing a direct current signal representative of a load limiting current, means for connecting said load limiting current signal in a parallel relationship with the series combination of said voltage signal and said load current signal, said load limiting current signal being connected with the polarities connected the same as said voltage signal and proportioned to provide a signal of substantially the same voltage magnitude as said series combination of voltage and load current signals corresponding to a predetermined load limiting current whereby the arrangement of said signals is effective to change the control signal only upon a change of load current in excess of said predetermined load limiting current, magnetic control means responsive to said control signal to control the amplitude of the current for said field winding, said control means comprising a plurality of magnetic cores each having a control winding and a load winding coupled thereto, each of said magnetic cores having at least a single stable state and being in said state, a bridge rectifying circuit having four arms, said control windings connected in said bridge circuit in separate arms having a common point, means for connecting said control signal between a pair of diagonally opposite points in said bridge circuit, means for supplying an alternating current signal and for connecting same across the remaining diagonally opposite points of said bridge circuit, the bridge rectifier being connected to pass the combination of said control signal and the alternating current signal when said signals combine in an additive relationship to alternately provide a signal for energizing said control windings to thereby change the magnetic condition of said cores from said stable state, another bridge rectifying circuit having four arms, said load windings connected in said latter mentioned bridge circuit in separate arms having a common point, and means for supplying a further alternating current signal and for connecting same between a pair of diagonally opposite points in said latter mentioned bridge circuit to cause a current to flow through said load windings alternately with respect to the energization of their corresponding control windings, said load winding alternating current signals being proportioned to saturate said cores, the magnitude of the load currents upon saturation being inversely proportional to said signals applied to said control windings, said field winding being connected across the remaining diagonally opposite terminals of said bridge circuit to receive said load currents.

9. In a regulating system for an alternating current machine, a field winding for said machine, a direct current load circuit, a main rectifier connected intermediate said machine and said load circuit for supplying the latter, sensing means coupled to said machine for deriving a control signal representative of the electrical characteristic of said load circuit, a plurality of magnetic cores each having a control winding and a load winding coupled thereto, each of said magnetic cores being in a predetermined magnetic condition, a bridge rectifying circuit having four arms, said control windings connected in said bridge circuit in separate arms having a common point, means for connecting said control signal between a pair of diagonally opposite points in said bridge circuit, means for deriving an alternating current signal from said machine and for connecting same across the remaining diagonally opposite points of said bridge circuit from said control signal, the bridge rectifier being connected to pass the combination of said control signal and the alternating current signal when said signals combine in an additive relationship to thereby provide a regulating signal for alternately energizing said control windings and being effective to change the predetermined magnetic conditions of said cores, a second bridge rectifying circuit having four arms, said load windings each being connected in said second mentioned bridge circuit in separate arms having a common point, means for deriving a further alternating current signal from said machine of the same phase as said first mentioned alternating current signal and for connecting said further alternating current signal between a pair of diagonally opposite points of said second mentioned bridge circuit to cause a current to alternately flow through said load windings with respect to their corresponding control windings, said load winding currents being effective to saturate said cores whereby the magnitude of said load coil currents are inversely proportional to the strength of said regulating signal applied to said control windings, a further plurality of magnetic cores each having a winding acting as a combined control and a load winding, each of said magnetic cores being in a predetermined magnetic condition, a bridge rectifying circuit having four arms for said latter plurality of magnetic cores, said combined windings each being connected in said bridge circuit in separate arms having a common point, circuit means connected between the remaining diagonally opposite points of said second mentioned bridge circuit and between a pair of diagonally opposite points in said third mentioned bridge circuit for delivering the load winding currents to the third mentioned bridge circuit, means for deriving a further alternating current signal from said machine and connected across the remaining diagonally opposite points of said third mentioned bridge circuit, the bridge rectifiers for said third mentioned bridge circuit being connected to pass the combination of said latter mentioned alternating current signal and the signal derived from said load winding currents when said signals are connected in a differential relationship to alternately provide an energizing signal for said combined windings when the latter are acting as control windings and effective to change the predetermined magnetic conditions of said cores, a further bridge rectifying circuit having four arms for said latter plurality of magnetic cores, said combined windings being further connected in said fourth mentioned bridge circuit in separate arms having a common point, and means for deriving a further alternating current signal from said machine and for connecting same between a pair of diagonally opposite points in said fourth mentioned bridge circuit to cause a current to flow alternately through said combined windings when the latter are acting as load windings, said load winding currents being effective to alternately saturate said cores, said field winding being connected between a pair of diagonally opposite points of said bridge circuit to receive the currents flowing through said combined windings when the latter are acting as load windings, the magnitude of said field winding currents being directly proportional to said signal for said combined windings when the latter are acting as control windings.

10. In an electrical generating system, a polyphase alternator, a field winding for said alternator, a direct current load circuit, a main rectifier connected intermediate said alternator and said load circuit for supplying the latter, circuit means connected in a parallel relationship with said load circuit for providing a signal representative of said load voltage, sensing means coupled to one of the phases of said alternator to derive a signal representative of said load voltage, sensing means coupled to one of the phases of said alternator to derive a signal representative of the current of said load circuit, rectifying means connected between said sensing means and said circuit means, said rectifying means being connected in series with said circuit means for providing a signal of opposite polarity from said load voltage signal whereby the series combination of said signals provides a control signal, further sensing means coupled to another phase of said alternator for providing a load limiting current signal, rectifying means connected to said latter mentioned sensing means and connected in a parallel relationship with the first mentioned sensing means and the series combination of said voltage signal and said load current signal with the polarities of said load limiting current signal connected the same as said voltage signal, said load limiting current signal being proportioned to provide a signal of substantially the same voltage magnitude as said series combination to correspond to a predetermined load limiting current whereby said load limiting current signal is effective to change the control signal only upon a change of load current in excess of said predetermined load limiting current, a plurality of magnetic cores each having a control winding and a load winding coupled thereto and each being in a predetermined magnetic condition, a bridge rectifying circuit having four arms, said control windings connected in said bridge circuit in separate arms having a common point, means for connecting said control signal between a pair of diagonally opposite points in said bridge circuit, means for deriving an alternating current signal from said alternator and for connecting same across the remaining diagonally opposite points of said bridge circuit from said control signal, the bridge rectifier being connected to pass the combination of said control signal and the alternating current signal when said signals combine in an additive relationship to thereby alternately provide a regulating signal for energizing said control windings and effective to change the predetermined magnetic conditions of said cores, at least a single feedback winding for each of said magnetic cores and being connected in a series relationship with the load winding of a different magnetic core and wound to provide a flux in opposition to the flux generated by the control winding for said different core, a further bridge rectifying circuit having four arms, said series combinations of feedback and load windings each being connected in said bridge circuit in separate arms having a common point, means for deriving a further alternating current signal from said alternator of the same phase as said first mentioned alternating current signal and for connecting the same between a pair of diagonally opposite points of said latter mentioned bridge circuit to cause a current to alternately flow through said load windings with respect to their corresponding control windings, said load winding currents being effective to saturate said cores whereby the magnitude of said load winding currents are dependent upon said changed magnetic condition resulting from said regulating signal applied to said control windings, power amplifying means connected between the remaining pair of diagonally opposite points of said latter mentioned bridge circuit to receive and amplify the currents alternately flowing through said load windings, and rectifying means connected between said amplifying means and said field winding for providing a direct current excitation to said field winding whereby at least one of the electrical characteristics of said load circuit are maintained substantially constant.

11. In an electrical generating system, a polyphase alternator, a self excited shunt field winding for said alternator, a direct current load circuit, a main rectifier connected intermediate said alternator and said load circuit for supplying the latter, circuit means connected in a parallel relationship with said load circuit for providing a signal representative of said load voltage, a current transformer coupled to one of the phases of said alternator to derive a signal representative of the current for said load circuit, full wave rectifying means connected between said current transformer and said circuit means, said rectifying means being connected in a series differential relationship with said circuit means whereby the series combination of said signals provides a control signal, another current transformer coupled to another phase of said alternator for providing a load limiting current signal, full wave rectifying means connected to said latter current transformer and having its output terminals connected in parallel relationship with said circuit means and first named full wave rectifying means and the series combination of said voltage signal and said load current signal with the polarities of said load limiting current signal connected the same as said voltage signal, said load limiting current signal being proportioned to provide a signal of substantially the same voltage magnitude as said series combination to correspond to a predetermined load limiting current whereby said load limiting current signal is effective to change the control signal only upon a change of load current in excess of said predetermined load limiting current, a plurality of magnetic cores each having a control winding and a load winding coupled thereto, each of said magnetic cores being in a predetermined magnetic condition, a bridge rectifying circuit having four arms, said control windings connected in said bridge circuit in separate arms having a common point, means for connecting said control signal between a pair of diagonally opposite points in said bridge circuit, means for deriving an alternating current signal from said alternator and for connecting same across the remaining diagonally opposite points of said bridge circuit from said control signal, the bridge rectifier being connected to pass the combination of said control signal and the alternating current signal when said signals combine in an additive relationship to thereby provide a regulating signal for alternately energizing said control windings and being effective to change the predetermined magnetic conditions of said cores, at least a single feedback winding for each of said magnetic cores and being connected in a series relationship with the load winding of a different magnetic core and wound to provide a flux in opposition to the flux generated by the control winding for said different core, a further bridge rectifying circuit having four arms, said series combinations of feedback and load windings each being connected in said second bridge circuit in separate arms having a common point, means for deriving a further alternating current signal from said alternator of the same phase as said first mentioned alternating current signal and for connecting the same between a pair of diagonally opposite points of said second bridge circuit to cause a current to alternately flow through said load windings with respect to their corresponding control windings, said load winding currents being effective to saturate said cores whereby the magnitude of said load winding currents are dependent upon said changed magnetic condition resulting from said regulating signal applied to said control windings, a voltage division circuit connected between the remaining diagonally opposite points of said second bridge circuit to receive the currents flowing through said load windings, a further plurality of magnetic cores each having a winding acting as a combined control and a load winding and each having a feedback winding, each of said magnetic cores being arranged in a predetermined magnetic condition, said feedback windings being connected in a series relationship with the combined control and load winding of a different magnetic core to provide a flux in opposition to said combined winding, a third bridge rectifying circuit having four arms for said latter plurality of magnetic cores, said combined and said feedback windings being connected in separate arms of said third bridge circuit having a common point, a portion of said voltage division circuit being connected between a pair of diagonally opposite points in said third bridge circuit, means for deriving an alternating current signal from said alternator and for connecting the same across the remaining diagonally opposite points of said third bridge circuit, the bridge rectifiers for said third circuit being connected to pass the combination of said alternating current signal and the signal derived from said voltage division circuit when said signals are connected in a differential relationship to alternately provide an energizing signal for said combined windings when the latter are acting as control windings and effective to change the predetermined magnetic conditions of said cores, a fourth bridge rectifying circuit having four arms for said latter plurality of magnetic cores, said combined windings and said feedback windings being further connected in separate arms of said fourth bridge circuit having a common point, and means for deriving a further alternating current signal from said alternator of the same phase as said latter mentioned alternating current signal and for connecting same between a pair of diagonally opposite points in said fourth bridge circuit to cause a current to flow alternately through said combined windings when the latter are acting as load windings, said latter metioned currents being effective to alternately saturate said cores, said field winding connected between a pair of diagonally opposite points of said fourth bridge circuit to receive the current flowing through said combined windings when the latter are acting as load windings, the magnitude of said field winding currents being dependent upon the magnetic condition of said cores resulting from said voltage division signal applied to said combined windings when the latter are acting as control windings.

12. In an electrical generating system, an alternator, a field winding for said alternator, a load circuit connected to said alternator, circuit means connected in a parallel relationship with said load circuit for providing a signal representative of said load voltage, sensing means coupled to one of the phases of said alternator to derive a signal representative of the current for said load circuit, means for connecting said current signal in series opposition with said voltage signal, further sensing means coupled to said alternator for providing a load limiting current signal, means for connecting load limiting current signal in a parallel relationship with the series combination of said voltage and current signals, said load limiting current signal being connected with the polarities connected the same as said voltage signal and proportioned to provide a signal of substantially the same voltage magnitude as said series combination of signals corresponding to a predetermined load limiting current and to exceed said combination of signals when the load current exceeds the predetermined load current, and control means connected for receiving the aforementioned arrangement of signals and to vary the excitation for said field winding in an inverse relationship to the combined variations thereof.

13. A method for regulating the excitation of an electrical generating system for maintaining the electrical characteristics of a load connected to said system substantially constant comprising, deriving a signal from said generating system representative of said electrical load characteristics, combining said signal with an alternating current signal, applying the combination of said signals to a magnetic device in a stable magnetic state whereby the combination of said signals are effective to change said stable magnetic state, applying upon termination of said combination of signals another signal to said magnetic device effective to change the magnetic condition of said device in the opposite direction and to saturate said device whereby said device assumes said stable magnetic state upon termination of said latter mentioned signal, deriving an excitation current from said magnetic device during said saturation period, and applying the thus derived excitation current to the excitation for said system whereby said excitation current is inversely proportional to the strength of said combined signals.

14. A method for regulating the excitation of an alternating current system for maintaining at least one of the electrical characteristics of a load connected to said system substantially constant comprising deriving a direct current signal from said system representative of said electrical load characteristics, deriving a substantially constant signal from said generating system and combining said signal with said direct current signal, applying the combination of signals to a magnetic device being in a stable magnetic state when said signals combine in an additive relationship whereby the combined signals are effective to change said stable magnetic state, deriving another substantially constant signal from said system of the same phase as said first mentioned signal, applying said latter derived signal upon termination of said combination of signals to said magnetic device, said latter derived signal being proportioned to saturate said device in the direction of said stable magnetic state whereby said device assumes said stable state upon termination of said signal, deriving an excitation current from said magnetic device during said saturation period, and applying the thus derived excitation current to regulate the output of said system whereby said excitation current is inversely proportional to the strength of said combined signals.

15. The method of continuously regulating the excitation of an electrical generating system for maintaining at least one of the electrical characteristics of a load connected to said system substantially constant comprising deriving a direct current signal from said generating system representative of said electrical load characteristics, combining said signal with a substantially constant alternating current signal, alternately applying the combination of signals to a magnetic device arranged in a stable magnetic state only when said signals combine in an additive relationship, the combination of said signals being effective to change said stable magnetic state, applying another signal of substantially constant amplitude upon termination of said combination of signals alternately and momentarily to said magnetic device effective to saturate same for a period of time dependent upon the extent of the change of the magnetic condition from said stable state whereby said device assumes said stable magnetic state upon termination of said signal, deriving an excitation current from said magnetic device during said saturation period, and applying said excitation current for regulating the excitation of said system.

16. In an electrical generating system, an alternator, a field winding for said alternator, circuit means connecting a direct current load circuit to said alternator, circuit means connected with said load circuit for providing a unidirectional voltage signal representative of the voltage of said load circuit, sensing means coupled to said alternator for providing a direct current load current signal representative of the load current in said load circuit, means for combining said load current signal in a series relation with said voltage signal in a bucking relation to provide a composite signal, sensing means coupled to said alternator for providing a load limiting direct current signal, means for combining said load limiting direct current signal in a parallel relationship with said composite signal with the polarity of the load limiting signal the same as the unidirectional voltage signal, said load limiting signal having a magnitude corresponding to a predetermined limiting value of load current effective to combine with said unidirectional voltage signal and said direct current signal to provide a combination signal, and control means including field circuit means connected to receive said combination signal and vary the excitation for said field winding in response to the variations of said combination signal and in an inverse relationship thereto.

References Cited in the file of this patent

UNITED STATES PATENTS

| | | |
|---|---|---|
| 2,066,919 | West | Jan. 5, 1937 |
| 2,558,572 | Logan | June 26, 1951 |
| 2,631,268 | Ransom | Mar. 10, 1953 |
| 2,646,543 | Gilchrist | July 21, 1953 |
| 2,663,833 | Fisher | Dec. 22, 1953 |
| 2,675,518 | Morgan | Apr. 13, 1954 |